Patented Apr. 6, 1954

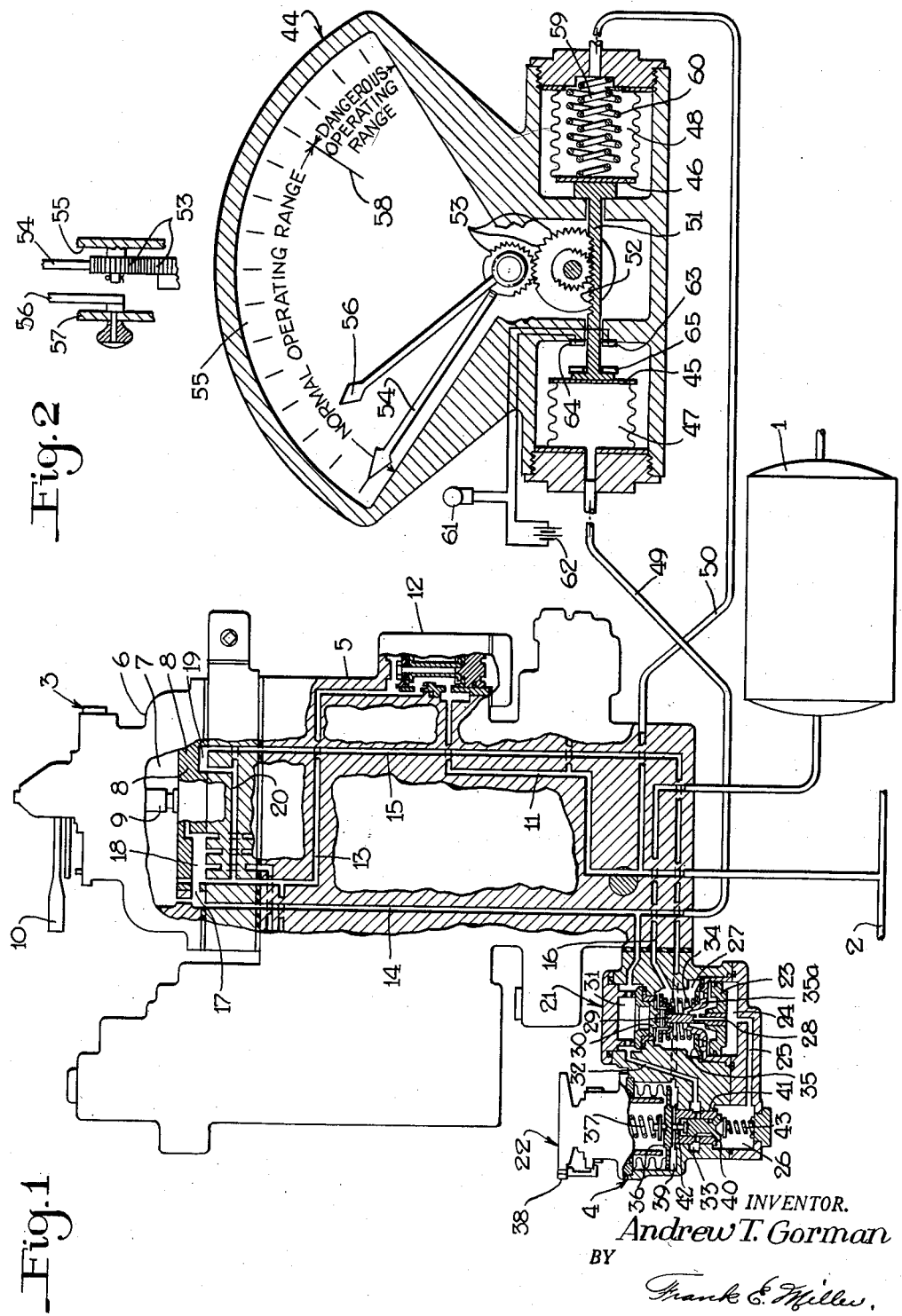

2,674,121

UNITED STATES PATENT OFFICE 2,674,121

CHARGE INDICATING MEANS FOR FLUID PRESSURE TRAIN BRAKE SYSTEMS

Andrew T. Gorman, Pitcairn, Pa., assignor to Westinghouse Air Brake Company, a corporation of Pennsylvania Application June 8, 1949, Serial No. 97,768

2 Claims. (Cl. 73—39)

This invention relates to fluid pressure brakes of the type employed on railway trains and more particularly to indicating means for use on the power car or locomotive for constantly informing the operator or engineer of the condition of the brake pipe and brake equipments throughout the train with respect to pressure of fluid therein, or leakage of fluid under pressure therefrom, so that he may be governed accordingly in controlling the brakes on the train to better insure the safety thereof.

The only means at present employed on a railway train to indicate to the operator the pressure condition of the brake pipe and brake equipments of the train is a pressure gage located in the cab of the locomotive and connected to the brake pipe at the locomotive. The information furnished by this gage is however often deceptive as to the true condition of the brake pipe and brake equipments throughout the train, since toward the middle and rear of a train the brake pipe pressure will usually be lower than at the front by a degree depending upon the amount of leakage of fluid under pressure therefrom. This is particularly true with the brake equipment employed on modern locomotives having high capacity feed valves and brake valve devices for charging the brake pipe, such for example, as exemplified in Patent 2,314,397, issued to Ellis E. Hewitt on March 23, 1943, since with such equipment the brake pipe gage on the locomotive may indicate that the brake pipe is fully charged when as a matter of fact the pressure in the brake pipe to the rear of the locomotive and particularly at the rear end of the train may be much lower.

If the engineer relies upon the indication by the pressure gage that the brake system on a train is fully charged when actually full charge exists only in the brake pipe at the locomotive and perhaps on a few cars immediately adjacent the locomotive, it is possible that when he operates the brake valve device to effect an application of brakes a harsh, damaging running in of slack between cars will occur with possible derailment of cars or buckling of the train. It is also possible that an undesired emergency application of the brakes will occur when a service application is intended if the brake pipe gradient, that is, the difference between the pressures in the brake pipe at the front and rear of the train, is sufficiently great. These results are liable to occur because when the brake valve device is operated to cut off the supply of fluid under pressure to the brake pipe and to effect a service application of brakes, the brake pipe pressure at the locomotive will reduce by the tendency to equalize with the lower pressure of fluid at the rear of the train and the consequent reduction in the pressure at the locomotive may result in an excessive service application of brakes or be at a rate sufficient to effect an emergency application of brakes.

If an engineer should depend upon the brake pipe gage in cycling operation of train brakes during descent of a grade there also exists the possibility of excessive service applications of brakes or of an undesired emergency application of brakes on the train due to reasons above mentioned, and there is also the possibility that he may misjudge recharging operations of the train to an extent that adequate control of the train is lost and the train may run away. More specifically, in cycling the brakes on a grade, it is customary to alternately apply the train brakes and then recharge the train brake system during which time the brakes throughout the train will partially release. If the recharge during the intervals between applications is sufficient to provide an adequate reapplication of brakes through the train, the train safety is assured, but if inadequate, as may occur particularly in case of excessive leakage from the train brake system, the pressure of fluid in the brake equipments toward the rear of the train may gradually get lower and lower until eventually it is insufficient for the safety of the train. If the engineer senses such a condition he may effect an emergency application of brakes on the train to bring it to a stop and then, while holding the train stopped with the locomotive, recharge the system so as to be able to proceed with safety. Otherwise the train may run away. During such cycling operation the brake pipe gage at the locomotive may register full brake pipe pressure during recharging operations while actually the pressure in the brake pipe and brake equipments back of the locomotive may be getting lower and lower as above mentioned.

In order to insure the safety of a train it may be mentioned here that before a train is ever moved by an engine or locomotive the engineer makes a leakage test of the brake pipe on the train. To accomplish this he first charges the brake equipment on the train then makes a partial service reduction in brake pipe pressure followed by movement of the brake valve device to lap position, in response to which, the brake controlling valve devices or the like on the cars of the train all operate to effect a corresponding service application of brake and then move to their lap position. By observing the brake pipe gage on the locomotive the engineer then measures the drop in brake pipe pressure over a certain period of time to see if the leakage is within prescribed limits. If the leakage is excessive the cause must be found and corrected before the engineer will move the train. With the brake valve and brake controlling valve devices on the locomotive and cars of the train in their lap position it will be observed however that this test is only of leakage of fluid under pressure from the brake pipe, while leakage of fluid under pressure from both the brake pipe and brake controlling valve devices in their release position might be much greater. Further, leakage will also vary with a train in motion and according to whether the slack in the train is stretched or bunched. The leakage test above mentioned is therefore only on the side of safety and while it provides the engineer with a general idea of the leakage condition of the brake system of a standing train he must nevertheless use caution in subsequently braking the train to compensate for conditions which he is not aware of in order to avoid difficulties such as above described.

Moreover with the very great tractive effort of modern locomotives coupled with the modern high capacity feed valves and brake valve devices to charge the brake pipe of a train, if the conductor of a train operates the usual conductor's valve device at the rear end to cause a service application of brakes, the engineer may never sense what is occurring. He may note a slight slowing down or increased drag from the train and since the brake pipe gage of the locomotive may still indicate a fully charged brake pipe he may merely increase the output of power of the locomotive to compensate and keep the train moving or break it in two. Even in case of a break-in-two and an emergency application of brakes throughout the train, the feed valve device may rebuild brake pipe pressure at the locomotive to full pressure without the engineer sensing what has happened and therefore continue with full power of the locomotive until it is stalled if there are sufficient cars still attached to the locomotive with their brakes applied. If there are insufficient cars to stall the locomotive it may continue rolling for some time before the engineer becomes aware of the condition.

From the above remarks it will therefore be seen that it is very desirable that some means be provided the engineer to constantly inform him of the true condition of the brake pipe and brake equipments through a train with respect to pressure of fluid therein, or leakage of fluid under pressure therefrom, so that at the time of initiating an application of brakes he may be governed accordingly, and for also positively drawing his attention to a condition such as created by a break-in-two of a train or of a conductor effecting a reduction in brake pipe pressure at the rear end of the train so that he will promptly cut off the power to the locomotive and permit the train to stop.

The principal object of the invention is therefore the provision of improved means for accomplishing the above results.

Other objects and advantages will become apparent from the following more detailed description of the invention.

In the accompanying drawing: Fig. 1 is a diagrammatic view, partly in section and partly in outline, of certain elements of a modern locomotive brake equipment with which the invention is associated; and Fig. 2 is a sectional view of a portion of an indicating device shown in Fig. 1.

*Description*

As shown in the drawing the reference numeral 1 designates a locomotive main reservoir adapted to receive and store fluid under pressure for controlling the brakes on the locomotive and cars of a connected train; the reference numeral 2 designates a brake pipe adapted to be connected to the brake pipe of a train in a well-known manner; reference numeral 3 designates an engineer's automatic brake valve device for supplying fluid under pressure from said main reservoir to said brake pipe; and reference numeral 4 designates a feed valve device for limiting the pressure of fluid thus supplied to the brake pipe to a degree predetermined by the adjustment of said feed valve device. The brake valve device 3 is of the general high capacity type employed on modern locomotives and comprises a pedestal like body 5 to which is connected the main reservoir 1 and upon which is removably mounted the feed valve device 4. A cover element 6 secured to the top of the body 5 has a chamber 7 containing the usual rotary valve 8 which is connected by a shaft 9 to the usual handle 10 arranged to be operated to the usual brake controlling positions that is, release, running, service, lap and emergency, by the engineer for controlling the brakes. In the drawing the handle 10 and thereby the rotary valve 8 are shown in their running position which is employed for charging the brake system on the locomotive and cars of a train.

The brake pipe 2 is open through a passage 11 in the brake valve body 5 and a normally open brake pipe cut-off valve device 12 to a passage 13 leading to the seat of the rotary valve 8. The brake valve body also has a feed valve delivery passage 14 and a feed valve control passage 15 both open at one end to the seat of rotary valve 8 and at the opposite end to the feed valve device 4. The main reservoir 1 is connected by way of a passage 16 to said feed valve device. With the rotary valve 8 in running position the one end of passage 14 opens through choke means such as a restricted port 17 in the side of said rotary valve to a cavity 18 therein which cavity registers with passage 13, and a cavity 19 in said rotary valve connects a branch 20 of passage 13 to passage 15.

The feed valve device 4 also is of the high capacity type employed on modern locomotives and comprises a supply portion 21 for controlling communication between passages 16 and 14 and thereby supply of fluid under pressure from the main reservoir 1 to the brake pipe 2 by way of passage 14, cavity 18 in the rotary valve 8, passage 13, the cut-off valve device 12 and passage 11. The feed valve device further comprises a regulating portion 22 which controls the operation of the supply portion 21 and the pressure of fluid supplied thereby to the brake pipe.

The supply portion 21 of the feed valve device embodies a piston 23 having at one side a control chamber 24 connected by way of a passage 25 to a valve chamber 26 in the regulating portion 22. At the opposite side of piston 23 is a valve chamber 27 which is open by way of passage 16 with the main reservoir 1. A restricted passage 28 through piston 23 connects chambers 27 and 24. Contained in valve chamber 27 and connected to a stem 29 of the piston 23 for movement with said piston is a valve 30 for controlling communication between the chamber 27 and a delivery chamber 31 which is open to passage 14 in the brake valve body and also by way of a passage 32 to a chamber 33 in the regulating portion 22. A spring 34 contained in chamber 27 and bearing at one end against an air strainer 35 mounted on a piston guide 35a acts on stem 29 for constantly urging the valve 30 to a closed position.

The regulating portion 22 of the feed valve device comprises a movable abutment 36 subject on one side to the force of a pressure regulating spring 37 which is adjustable by the usual hand wheel 38. At the opposite side of abutment 36 is a control chamber 39 open to the feed valve control passage 15 in the brake valve body 5. A valve 40 contained in chamber 26 has a fluted stem slidably mounted in a bore provided through a bushing 41 secured in the casing. The bushing 41 extends through chamber 33 and terminates in chamber 39 in coaxial relation to the abutment 36, said bushing have a plurality of radial bores connecting the bore therein to chamber 33 whereby valve 40 is adapted to control communication between chambers 26 and 33. Projecting from the end of the fluted stem of the valve 40 is a pinlike stem 42 which slidably extends through a suitable bore in one end of bushing 40 into chamber 39 wherein it contacts abutment 36. When the hand adjusted force of regulating spring 37 on one side of abutment 36 exceeds the opposing pressure of fluid in chamber 39 said spring is adapted to open the valve 40 and when less said valve is adapted to be closed by a spring 43.

According to the invention I associate with the locomotive brake equipment, so far described, an indicator device 44 which is adapted to be located in the cab of the locomotive for ready observation by the engineer.

The indicator device 44 comprises a casing containing two coaxially arranged and spaced apart movable abutments 45 and 46, preferably in the form of bellows diaphragms, at the opposite or outer sides of which there are provided pressure chambers 47 and 48, respectively, while the adjacent sides of said abutments are open to atmosphere. Pressure chamber 47 is open by way of a pipe 49 to the feed valve delivery passage 14 in the body 5 of the brake valve device while chamber 48 is open by way of a pipe 50 to passage 11 in the brake valve device and thereby to the brake pipe 2. The two movable abutments 45 and 46 are engaged on adjacent faces by opposite ends of a movable stem 51. An intermediate portion of the stem 51 is in the form of a toothed rack 52 which is operative through a train of gears 53 for adjusting a pointer 54 with respect to a dial 55. Arranged to turn about the same axis and over the pointer 54 is a manually adjustable pointer 56 which may be carried by a crystal 57 mounted over the dial 55, as indicated in Fig. 2.

The pointer 54 has a "Normal Operating Range" of movement over dial 55 to the left of a line 58 and a "Dangerous Operating Range" of movement to the right of said line. A light bias spring 59 provided in chamber 48 acts on the abutment 46 for opposing movement of the pointer 54 in the direction of line 58 at which line a second spring 60, also contained in said chamber is arranged to become effective to oppose further movement of said pointer in the direction of the right hand.

A danger signaling device 61, preferably of the audible electric bell type, adapted to be located in the locomotive cab for warning the engineer of the existence of a dangerous condition, has one terminal connected with an electric battery 62 and its opposite terminal connected to a fixed contact 63, another fixed contact 64 being connected to the other terminal of the battery. The two contacts 63 and 64 are secured in the casing and arranged for engagement by a contact 65 carried by the stem 51 at a time when the pointer 54 obtains substantially its most right hand position on dial 55 for causing operation of the bell 61.

*Operation*

With the engineer's brake valve device 3 in running position, in which it is shown in the drawing, and with the main reservoir 1 charged with fluid under pressure, let it be assumed that the brake pipe 2 on the locomotive and cars of a train which may be connected to the locomotive, as well as the brake equipment thereon, are leaktight and fully charged to the adjustment of the feed valve device 4. In actual service such a leaktight brake system is seldom if ever obtained, but for the present description let it be assumed that such is the case, under which condition there will be no flow of fluid under pressure to the brake pipe 2 and the pressure of fluid in said brake pipe will be effective through passages 11, 13, and 29 in the brake valve device, cavity 19 in the rotary valve 8 and passage 15 in chamber 39 of the regulating portion 22 of the feed valve device 4, and deflect movable abutment 36 against spring 37 to permit valve 40 to close whereby pressure of fluid in piston chamber 24 will be equalized through the restricted passage 28 with the main reservoir pressure in chamber 27 to permit closing of valve 30 by spring 34 for preventing flow of fluid under pressure to the brake pipe. There being no flow of fluid under pressure through the feed valve delivery passage 14 to the brake pipe under this leaktight condition the pressure of fluid in diaphragm chamber 47 in the indicating device 44 will be equal to brake pipe pressure in chamber 48, as a result of which, the spring 59 will actuate the gear train 53 to move the pointer 54 to the extreme left side of dial 55, in which position it is shown in the drawing and which indicates that there is no flow of fluid under pressure to the brake system and that the system is leaktight.

Now assume that there is a certain degree of leakage of fluid under pressure from the brake pipe 2 on the locomotive and connected cars of a train and from the respective brake equipments. Under such a condition the pressure of fluid in the brake pipe 2 and thereby in the connected chamber 39 of the regulating portion 22 of the feed valve device will be reduced sufficiently below the opposing force of the regulating spring 37 to permit said spring to open valve 40 to release fluid under pressure from piston chamber 24 past said valve to the feed valve delivery passage 14 and thence to the brake pipe 2 whereby main reservoir pressure in chamber 27 will actuate piston 23 to open the valve 30 to permit flow of fluid under pressure from the main reservoir 1 to the delivery passage 14 and thence to the brake pipe 2 and brake system of the train for increasing or maintaining the pressure of fluid therein. The pressure of fluid in a brake pipe 2 will thus tend to build up, and when sufficiently increased, such pressure acting in chamber 39 on movable abutment 36 will actuate said abutment against spring 37 to permit valve 40 to move toward its seat for restricting flow of fluid under pressure from piston chamber 24 with respect to supply of fluid thereto through the restricted port 28 to such a degree that spring 34 will move the valve 30 to a position with respect to its seat where the supply of fluid to the brake pipe 2 will just equal the leakage of fluid under pressure therefrom and from the connected brake equipments of the train.

In case the leakage of fluid under pressure from the brake pipe 2 and connected brake system of the train is of a greater degree the pressure of fluid in the brake pipe 2 at the locomotive and in chamber 39 of the regulating portion 22 will be reduced to a slightly lower degree, than for a lesser degree of brake pipe leakage, in which case the valve 40 will be opened to a slightly greater extent followed by operation of piston 23 to effect a corresponding increase in opening of valve 30, whereby a greater amount of fluid under pressure will be supplied to the brake pipe to offset the greater degree of leakage of fluid under pressure therefrom.

It will thus be seen that the movable abutment 36 and valve 40 in the regulating portion 22 of the feed valve device will assume a position corresponding to the rate of leakage of fluid under pressure from the brake pipe 2 and the brake system of a train and the piston 23 will operate to correspondingly position the valve 30 with respect to its seat to supply just sufficient fluid to the brake pipe on the locomotive to compensate for such leakage throughout the train. It will also be seen that if a conductor's valve device at the rear of a train is operated to effect a service reduction in pressure in the brake pipe on the train and locomotive, or in case of a break-in-two back in the train, that the feed valve device 4 will operate to its capacity to supply fluid to the brake pipe to compensate for such loss.

In order that the feed valve device 4 will restore and maintain pressure of fluid in the brake pipe as above described the control pressure in chamber 39 of the regulating portion 22 of the feed valve device is taken from passage 11 in the brake valve body 5 and therefore is substantially equal to that in the brake pipe 2 on the locomotive, whereby the feed valve device will operate at maximum capacity required to restore or maintain pressure of fluid in said brake pipe.

It will also be noted that the restricted port 17 in the side of the rotary valve 8 will offer restriction to flow of fluid under pressure from the feed valve delivery passage 14 to passage 13 and thence to the brake pipe, as a result of which, the pressure of fluid in said delivery passage, when the feed valve device is operating, will exceed that in the brake pipe on the locomotive. It has been found that the pressure of fluid provided in the feed valve delivery passage 14 by operation of the feed valve device will vary directly in proportion to the supply of fluid under pressure required for maintaining the pressure of fluid in a brake system of a train against loss, as by leakage, by operation of a conductor's valve device at the rear end of a train or even the parting of a train, and advantage is taken of this characteristic for controlling operation of the indicator device 44 to provide the engineer with constant information with respect to the leakage condition of the train brake system, or loss of fluid under pressure therefrom by operation of a conductor's valve device or otherwise as above mentioned, in a manner which will now be described.

Since the pressure chamber 47 in the indicator device 44 is open to the feed valve delivery passage 14 it will be apparent that the movable abutment 45 will be constantly acted upon by pressure of fluid from said passage which will vary according to loss of fluid under pressure from the brake system of a train, while the movable abutment 46 will be constantly subject in chamber 48 to pressure of fluid in the brake pipe 2 on the locomotive. If the brake system on the train is absolultely tight, as does not exist in service, then when the brake pipe is charged to the adjustment of the feed valve device the pressure of fluid in chambers 47 and 48 will be the same under which condition spring 59 will actuate the abutments 46 and 45 and the gear train 53 to move the pointer 54 to its extreme left hand position, as above described. However in case the feed valve device 4 is operating to supply fluid to the brake pipe at a rate corresponding to a certain rate of loss therefrom the pressure of fluid in the delivery passage 14 and thereby in chamber 47 of the indicator device 44 will exceed that in the brake pipe acting in diaphragm chamber 48 by a degree proportional to such loss, under which condition the movable abutments 45 and 46 will be moved toward the right hand against spring 59 until the pressure of said spring is increased sufficiently to offset the greater pressure of fluid in chamber 47, whereby the pointer 54 will be moved to a corresponding position on the dial 55. In case of greater leakage or loss of fluid under pressure from the brake system on the train the pressure of fluid in the feed valve delivery passage 14 will be correspondingly higher and the pointer 54 will assume a position further to the right on the dial 55. For any permitted rate of leakage of fluid under pressure from the brake system on a train the pointer 54 will thus assume a position somewhere between the extreme left hand position of dial 55 and the line 58, that is, within the "Normal Operating Range."

When the engineer is making a leakage test on a train prior to leaving a terminal the hand or pointer 54 will therefore assume a position with respect to dial 55 corresponding to the leakage of such fluid under pressure. The engineer will then position the pointer 56 over the pointer 54 and after the train is in motion any change in position of the pointer 54 relative to the pointer 56 will provide the engineer with a constant indication of any change in the leakage condition of the brake system on the train so that when he desires to effect an application of brakes on the train he may be governed accordingly.

Since the pointer 54 assumes a position corresponding to the degree of overcharge of the feed valve delivery passage 14 with respect to the pressure of fluid in the brake pipe 2 on the locomotive, and therefore in accord with the rate at which fluid under pressure is being supplied to the train brake system, it will be apparent that when in releasing the brakes during cycling operation the position of the pointer 54, relative to the normal leakage condition of the brake system as indicated by the pointer 56, will provide an indication to the engineer of the degree of charge of the brake system toward the rear end of the train, since the lower the charge a greater amount of fluid under pressure will be supplied to the brake pipe than for a higher charge. Therefore, in case the pressure of fluid in the brake system toward the rear of the train gradually diminishes during cycling operation, the pointer 54 will move further and further to the right to clearly indicate to the engineer this condition so that he may act accordingly.

The line 58 designates what may be considered the end of the safe operating range of pointer 54 with respect to loss of fluid under pressure from the brake system and movement of said pointer to the opposite side of said line will indicate visually that such loss is becoming dangerous with respect to safe control of the train. The movable contact 65 may be arranged to engage the contacts 63, 64 to cause operation of the bell 61 at any time after the pointer 54 moves to the right of line 58, if desired, but I prefer that the bell 61 only operate in case of loss of fluid from the brake system such as may be occasioned by pulling a train in two in which case the rate of supply of fluid to the brake pipe will be such as to throw the pointer 54 to substantially its extreme right hand position whereupon the bell 61 will operate to call the engineer's attention audibly to this condition.

Movement of the pointer 54 from line 58 to its extreme right hand position will be opposed by the auxiliary spring 59 the only purpose of which however is to shorten the movement of the pointer 54 for such an abnormal condition whereas greater movement of the pointer is required in the normal operating range thereof to the left of line 58 to provide with a desired degree of accuracy the information required by the engineer in connection with normal loss of fluid under pressure from the brake system.

Summary

From the above description it will now be seen that I have provided an arrangement for use with modern locomotive brake equipment which will provide the engineer on the locomotive with a constant indication of the leakage condition of his train or of the loss of fluid under pressure therefrom, so that he may control the brakes thereon accordingly with a maximum safety to the train and to laden carried thereby.

Having now described the invention, what I claim as new and desire to secure by Letters Patent, is:

1. In an automatic air brake system, in combination, a source of fluid under pressure, a brake pipe, a feed valve device comprising a supply portion for supplying fluid under pressure to said brake pipe, an engineer's brake valve device for establishing communication through which fluid under pressure supplied by said supply portion flows to said brake pipe and including choke means in said communication of less flow capacity than said supply portion, said feed valve device further comprising a regulating portion subject to pressure in said communication at the brake pipe side of said choke means and operative to control said supply portion to limit pressure of fluid in said brake pipe, spring means, pressure sensitive means subject to pressure of fluid supplied by said supply portion at one side of said choke means acting in opposition to pressure of said spring means plus pressure of fluid in said brake pipe at the opposite side of said choke means and movable in accordance with the differential between such opposing fluid pressures, a dial for indicating differential between pressures of fluid in said communication at opposite sides of said choke means, and an indicating element connected to and actuated by said pressure sensitive means relative to said dial.

2. In an automatic air brake system, in combination, a source of fluid under pressure, a brake pipe, a feed valve device comprising a supply portion for supplying fluid under pressure to said brake pipe, an engineer's brake valve device for establishing communication through which fluid under pressure supplied by said supply portion flows to said brake pipe and including choke means in said communication of less flow capacity than said supply portion, said feed valve device further comprising a regulating portion subject to pressure in said communication at the brake pipe side of said choke means and operative to control said supply portion to limit pressure of fluid in said brake pipe, and an indicating device comprising a dial graduated for indicating differential between pressures of fluid in said communication at opposite sides of said choke means, a pointer adjustable manually over said dial, spring means, pressure sensitive means subject to pressure of fluid supplied by said supply portion at one side of said choke means acting in opposition to pressure of said spring means plus pressure of fluid in said brake pipe at the opposite side of said choke means and movable in accordance with the differential between such opposing fluid pressures, and another pointer actuated by said pressure sensitive means over said dial.

References Cited in the file of this patent

UNITED STATES PATENTS

| Number | Name | Date |
|---|---|---|
| 1,007,178 | Billings | Oct. 31, 1911 |
| 1,344,340 | Fulton | June 22, 1920 |
| 1,416,210 | Jung et al. | May 16, 1922 |
| 1,681,551 | Miller | Aug. 21, 1928 |
| 1,881,266 | DeGiers | Oct. 4, 1932 |
| 1,883,522 | Breer | Oct. 18, 1932 |
| 2,177,520 | Farmer | Oct. 24, 1939 |
| 2,444,358 | Markson et al. | June 29, 1948 |
| 2,449,556 | Kirkley | Sept. 21, 1948 |
| 2,450,772 | Watkins | Oct. 5, 1948 |
| 2,457,401 | Rupley | Dec. 28, 1948 |
| 2,561,700 | Hughes | July 24, 1951 |

FOREIGN PATENTS

| Number | Country | Date |
|---|---|---|
| 135,869 | Great Britain | Nov. 27, 1919 |